(12) United States Patent
Kitamura et al.

(10) Patent No.: US 6,610,766 B1
(45) Date of Patent: Aug. 26, 2003

(54) POLYVINYLIDENE FLUORIDE RESIN COMPOSITION

(75) Inventors: Hideki Kitamura, Ibaraki (JP); Satoru Matsunaga, Ibaraki (JP); Yoshikichi Teramoto, Ibaraki (JP)

(73) Assignee: Kureha Kagaku Kogyo K.K., Tokyo (JP)

( * ) Notice: Subject to any disclaimer, the term of this patent is extended or adjusted under 35 U.S.C. 154(b) by 0 days.

(21) Appl. No.: 09/265,854

(22) Filed: Mar. 11, 1999

(30) Foreign Application Priority Data

Mar. 12, 1998 (JP) ............................... 10-082748

(51) Int. Cl.⁷ ................................. C08K 5/42
(52) U.S. Cl. ..................... 524/156; 428/398; 428/364; 428/421
(58) Field of Search ................ 524/156, 157, 524/159; 428/364, 398, 421

(56) References Cited

U.S. PATENT DOCUMENTS

| 3,703,569 A | | 11/1972 | Wolkowicz | 264/22 |
| 3,829,408 A | | 8/1974 | Wolkowicz | 260/88.25 |
| 4,013,531 A | | 3/1977 | Nakamura et al. | 204/180 R |
| 4,560,635 A | | 12/1985 | Hoffend et al. | 430/106.6 |
| 4,957,975 A | * | 9/1990 | Carlson et al. | 525/340 |
| 5,304,449 A | * | 4/1994 | Hollenbaugh, Jr. | 430/110 |
| 5,368,970 A | * | 11/1994 | Grushkin | 430/110 |

FOREIGN PATENT DOCUMENTS

| EP | 0 333 062 | 9/1989 |
| JP | 47-3835 | 2/1972 |
| JP | 51-32330 | 3/1976 |
| JP | 51-110658 | 9/1976 |
| JP | 51-111337 | 10/1976 |
| JP | 54-127872 | 4/1979 |
| JP | 55-26973 | 7/1980 |
| JP | 60-177064 | 9/1985 |
| JP | 61-72061 | 4/1986 |
| JP | 63-22872 | 1/1988 |
| JP | 1-97901 | 4/1989 |
| JP | 5-60931 | 3/1993 |
| JP | 6-157858 | 6/1994 |
| JP | 7-28266 | 1/1995 |
| JP | 8-99374 | 4/1996 |
| JP | 8-106019 | 4/1996 |

\* cited by examiner

*Primary Examiner*—Peter D. Mulcahy
(74) *Attorney, Agent, or Firm*—McDermott, Will & Emery

(57) ABSTRACT

The invention relates to polyvinylidene fluoride resin compositions comprising 100 parts by weight of a polyvinylidene fluoride resin, and 0.03 to 10 parts by weight of at least one compound selected from the group consisting of alkyl quaternary ammonium sulfates and alkyl quaternary ammonium sulfites.

21 Claims, 5 Drawing Sheets

POLYVINYLIDENE FLUORIDE RESIN COMPOSITION

FIELD OF THE INVENTION

The present invention relates to polyvinylidene fluoride resin compositions, and more particularly to polyvinylidene fluoride resin compositions which can be suitably used in the fields of which semiconductivity and/or transparency are required.

The resin compositions according to the present invention are suitable for use, for example, as resin materials for forming at least surface layers of charge controlling members (semiconductive members) such as charging rolls, transfer rolls, image-forming rolls, charging belts and destaticizing belts in image forming apparatus of the electrophotographic system making good use of their semiconductivity. The resin compositions according to the present invention are also suitable for use in application fields making good use of their static electricity controlling property, antistatic property, anti-dust-collecting property and the like, for example, as charge controlling members such as packaging materials (for example, films, bags and containers) for electronic parts, wall paper, sheathing materials for OA apparatus and anti-static partitions. In the present invention, the term, "semiconductive resin composition" means a resin material the volume resistivity of which lies between an insulator and a metallic conductor, and more specifically means a resin material having a volume resistivity of about $10^5$–$10^{13}$ Ωcm.

The resin compositions according to the present invention are suitably used, as application fields making good use of transparency (high light transmittance and low haze), as optical resin materials for optical members such as optical fibers and lenses, light-transmitting materials for solar cells, and lightening covers. The resin compositions according to the present invention are suitably used as optical members such as anti-dust-collecting window glass and protective materials for displays making good use of both properties of semiconductivity and transparency.

BACKGROUND OF THE INVENTION

In the fields of electric and electronic apparatus, resin materials the volume resistivities of which have been precisely controlled are demanded as semiconductive materials. For example, in image forming apparatus (electrophotographic copying machine, electrostatic recording apparatus, etc.) of the electrophotographic system, such as copying machines, facsimiles and laser-beam printers, images are formed through steps such as charging, exposure, development, transfer, fixing and static charge eliminating. In order to form respective members used in these steps, resin materials the volume resistivities of which have been precisely controlled are required.

A charging roll or belt, a transfer roll or belt, a developing roll, a blade for controlling the thickness of a toner layer, and the like installed in such an image forming apparatus are required to be semiconductive at least at their surface layers, and specifically to have a desired volume resistivity within a range of about $10^5$–$10^{13}$ Ωcm. For example, in a charging system making use of the charging roll or belt, voltage is applied to the charging roll or belt, and the charging roll or belt is then brought into contact with a photosensitive drum, whereby an electric charge is directly applied to the photosensitive drum to equally and uniformly charge the photosensitive drum. In a development system making use of the developing roll, a toner is adsorbed in a charged state on the surface of the developing roll by frictional force between the developing roll and a toner supply roll, and this toner is uniformly leveled by the blade for controlling the layer thickness of the toner, and the toner is then caused to fly toward an electrostatic latent image formed on the photosensitive drum by electric attraction force to develop the latent image. In a transferring system making use of the transfer roll or belt, voltage having a polarity opposite to that of the toner is applied to the transfer roll or belt to generate an electric field, whereby the toner on the photosensitive drum is transferred to a transfer material by electric attraction force generated by the electric field.

Accordingly, the charge controlling members such as the charging roll or belt in the image forming apparatus are required to have a low volume resistivity within a proper range. The volume resistivity itself is required to be uniform in distribution. If the volume resistivity varies with location, no high-quality image can be provided. For example, if the volume resistivity distribution of the charging roll or belt is uneven, it is difficult to equally and uniformly charge the photosensitive drum, so that the quality of the resulting image is deteriorated. In these members, it is also required that their volume resistivities and surface resistivities are not very changed by change of humidity. If the volume resistivities and surface resistivities of the charge controlling members are greatly changed by change of humidity in an ordinary use environment, no high-quality image can be stably provided.

Further, when dust, toner and/or the like are adsorbed on sheathing materials and parts of OA apparatus formed from a resin material, their appearances are impaired, or the cause of trouble is formed. When resin-made apparatus and parts used in the fabrication processes of semiconductor devices, LCD and the like, and films, bags and containers for packaging electronic parts such as IC and LSI adsorb dust by generation of static electricity, the quality of the electronic parts is impaired. It is therefore required that a volume resistivity of about $10^5 10^{13}$ Ωcm is imparted to resin materials used in these application fields, particularly, in facelayer materials thereof so that they may have good charge controlling.

As methods for lowering the electrical resistance (volume resistivity) of polyvinylidene fluoride resins and molded or formed products (hereinafter may be referred to as "moldings") thereof, there have heretofore been known (1) a method in which an organic antistatic agent is applied to the surfaces.of the resin moldings, (2) a method in which an organic antistatic agent is incorporated into the resins, (3) a method in which a conductive filler such as carbon black or metallic powder is incorporated into the resins, and (4) a method in which an ionic electrolyte is incorporated into the resins.

However, the method (1) involves a problem that since the polyvinylidene fluoride resins have excellent anti-adhesion property, the antistatic agent easily falls off from the surfaces of the moldings by wiping or washing the surfaces. In the method (2), a surfactant or hydrophilic resin is used as the organic antistatic agent. Since the method making use of the surfactant adopts a mechanism that the surfactant is caused to bleed out of the surface of each molding, thereby imparting antistatic property thereto, its volume resistivity and antistatic property are greatly changed by changes of environments such as temperature and humidity. In addition, high stain resistance, which is a merit of the polyvinylidene fluoride resins, is impaired. In the method making use of the hydrophilic resin, it is necessary to incorporate a great amount of the hydrophilic resin in order to achieve a desired antistatic effect. Therefore, excellent physical properties inherent in the polyvinylidene fluoride resins, such as stain resistance, weather resistance, ozone resistance and solvent resistance, are lowered. In addition, the method involves a problem that the dependency of volume resistivity and antistatic property on humidity becomes high. The stain resistance and solvent resistance are properties required in the case where a toner applied to a member arranged in an image forming apparatus of the electrophotographic system is removed by cleaning. Since an image forming apparatus equipped with a corona discharge device or the like generates ozone, the ozone resistance is also a property required of members in such an apparatus. The weather resistance is a property required in the case where the resins are used as surface-protecting materials for outdoor sign boards and window glass.

The method (3) is adopted in many fields. For example, a charging roll is formed by coating a core bar with a semiconductive resin composition obtained by incorporating a conductive filler into a resin. However, the semiconductive resin composition with the conductive filler dispersed in the resin generally has an extremely uneven distribution in volume resistivity. In mane cases, a scatter of the distribution amounts to several figures. Therefore, such a semiconductive resin composition has involved a problem from the viewpoint of practical performance. In particular, the polyvinylidene fluoride resin is small in surface energy, and has hence involved a problem that when a conductive filler is dispersed therein, the conductive filler becomes migrated in the resin by the application of high voltage, or the like, so that its volume resistivity varies. In addition, the polyvinylidene fluoride resin composition with the conductive filler dispersed therein is generally insufficient in dielectric strength and is not always suitable for use in application fields to which high voltage is applied repeatedly. Further, the charged amount of the conductive filler must be increased in order to attain the required level of semiconductivity. For that reason, there is encountered a problem that the molding and processing ability and mechanical strength of the resulting polyvinylidene fluoride resin composition are lowered, or its hardness becomes too high. Further, the polyvinylidene fluoride resin composition with the conductive filler dispersed therein is often colored by the conductive filler such as conductive carbon black. Therefore, such a composition is unsuitable for use in application fields such as sheathing materials for OA apparatus and wall paper.

The method (4) of incorporating the ionic electrolyte is expected to be a method effective for imparting semiconductivity to a polyvinylidene fluoride resin, judging from the fact that polyvinylidene fluoride (PVDF) has been known from of old to be a good conductor to ions (for example, Japanese Patent Application Laid-Open Nos. 32330/1976, 110658/1976, 111337/1976 and 127872/1979). However, a resin composition obtained by incorporating an inorganic metal salt such as lithium chloride or potassium chloride, which is a typical electrolyte, into a polyvinylidene fluoride resin has been difficult to lower its volume resistivity to $1 \times 10^{13}$ Ωcm or lower, since these inorganic metal salts are only slightly soluble in the resin. There has also been a problem that the aggregate of the inorganic metal salt added in excess forms the cause of fish eye. When kneading is conducted at a higher temperature or for a longer period of time in order to dissolve the aggregate in the polyvinylidene fluoride resin, the resin and/or the electrolyte is decomposed to impair its substantial mechanical properties and appearance. In the case of a deliquescent metal salt such as a Li salt, the resulting resin composition becomes hygroscopic when it is filled in a great amount. Therefore, this case involves problems that the volume resistivity of the composition is greatly changed by change of humidity, and that the surface of the resulting molding becomes sticky due to the deliquescence of the metal salt bled out.

As a method for improving the solubility of the electrolytes in a resin, Japanese Patent Application Laid-Open Nos. 177064/1985 and 72061/1986 have proposed a method in which a polar solvent such as propylene carbonate is contained in the resin. However, this method has involved problems that the Young's modulus of the resin is markedly lowered, and that the surface of the resin becomes sticky due to the electrolyte and solvent bled out.

There have hitherto been proposed methods of using a quaternary ammonium salt as an antistatic agent for resins. For example, Japanese Patent Publication No. 26973/1980 discloses an antistatic coating material with a quaternary ammonium salt and a resin dissolved in an organic solvent. However, this coating material is easy to fall off by washing and is hence difficult to retain its antistatic effect for a long period of time. Japanese Patent Application Laid-Open No. 3835/1972 discloses an antistatic sheet with a quaternary ammonium salt incorporated into polyolefin. However, this antistatic sheet depends on a mechanism that its antistatic effect is exhibited by bleeding of the quaternary ammonium salt out of the resin, so that its conductivity and antistatic effect are greatly changed by changes of environments such as temperature and humidity. In addition, since the electrolyte is hard to be ionized in a resin having a low polarity, such as polyolefin, the volume resistivity of the resin cannot be lowered, though its surface resistivity can be lowered. Further, since most quaternary ammonium salts, particularly, quaternary. ammonium halides are poor in heat stability, disadvantages such as foaming and coloring arise in the resulting moldings when such a quaternary ammonium salt is melt-mixed with a polyvinylidene fluoride resin (the processing temperature of this resin is about 220 to 270° C.).

Since many metal salts and quaternary ammonium salts are easy to bleed out in a high-humidity environment in particular, they have involved problems that metallic impurities on the surface of a static electricity-controlling packaging material form the cause of rejected products, for example, in a fabrication process of semiconductor devices, and that in a transfer roll or belt installed in an image forming apparatus of the electrophotographic system, its surface layer undergoes a change in volume resistivity due to the reduction of electrolytes in a resin, resulting in deterioration of image quality.

With respect to optical materials, in recent years, there has been a strong demand for development of transparent resin materials light and excellent in processability in the field of optoelectronics. However, transparent resin materials usable in the optical application fields have been limited to polymethyl methacrylate, polycarbonate, polystyrene, a part of polyolefin resins having an alicyclic structure, and the like. When such conventional resins are used for pickup lenses in, for example, compact disks and magneto-optical disks, a lens made of any one of the resins easy to absorb moisture, such as polymethyl methacrylate, polystyrene and polycarbonate, undergoes changes in dimensions and refractive index due to moisture absorption, which proceed from its surface, so that the properties of the lens become uneven as a whole. Therefore, such a lens has involved a problem that the wave surface of a laser beam is disordered by such unevenness to adversely affect both write and read. A pickup lens of a compact disc player installed in a car is required to have high heat resistance of 100 to 130° C. or higher. However, polymethyl methacrylate has been difficult to satisfy such a requirement.

In general optical systems such as projection televisions and cameras, chromatic aberration caused by differences in focal length according to wavelengths of light occurs at all costs in the case where only one lens is used. Therefore, a design called "achromatism", in which chromatic aberration is dissolved by combining a lurality of materials different in refractive index and Abbe's number from each other, is required. In glass lenses, the achromatic design can be made with comparative ease because the number of glass different in refractive index and Abbe's number amounts to at least 200 kinds. However, when only plastic lenses are used, the achromatic design is very difficult because usable transparent resin materials are only several kinds as described above, and the refractive indices of the respective resin materials concentrate on about 1.5 to 1.6. Therefore, novel transparent resin materials have been always demanded in this field.

As optical fibers, there have been known glass type optical fibers using fused quartz or compound glass as core and clad components and besides plastic optical fibers the core component and clad component of which are both formed from a plastic. The plastic optical fibers are easy in production and handling and cheap compared with the glass type optical fibers, and on the other hand, have had demerits that they are poorer in durability and heat resistance and greater in transmission loss.

Polyvinylidene fluoride (PVDF) is excellent in heat resistance and weather resistance, little in moisture absorption and as lower as about 1.42 in refractive index compared with other transparent resins, and is hence expected as.a clad component for plastic optical fibers. However, PVDF is easy to opacified by crystallization upon processing and forming or molding. Therefore, for example, Japanese Patent Application Laid-Open Nos. 22872/1988, 97901/1989, 60931/1993 and 106019/1996 have proposed a method in which PVDF is blended with an acrylic resin to make it transparent. However, such a method has had disadvantages that the excellent heat resistance, weather resistance and non-hygroscopicity characteristic of PVDF are lowered by blending with the acrylic resin, and its refractive index also comes close to that of the acrylic resin. Further, a blend system composed of resins alone involves problems of tending to become optically uneven and causing great light scattering.

Polyvinylidene fluoride resins are used as surface-protecting materials for office supplies, sign boards, building materials and the like making good use of their excellent weather resistance. However, they have been unsatisfactory in transparency to use as protective films for window glass and CRT.

As methods for improving the transparency of the polyvinylidene fluoride resins, there have heretofore been proposed a method in which an inorganic salt such as KCl or NaCl is used as a nucleating agent, and a method in which a substantially unstretched sheet-like or thread-like formed product is cold-stretched or stretched under high-temperature and high-pressure conditions. However, the method of adding the inorganic salt has involved a problem that the aggregate of the salt forms the cause of fish eye. The method of cold-stretching the substantially unstretched sheet-like or thread-like formed product or stretching it under high-temperature and high-pressure conditions requires a vast processing apparatus and has hence involved a problem from the viewpoint of productivity. In addition, both methods have been insufficient in the effect of improving the transparency.

OBJECTS AND SUMMARY OF THE INVENTION

It is an object of the present invention to provide a polyvinylidene fluoride resin composition which can stably and uniformly achieve a desired volume resistivity within a range of $10^5$–$10^{13}$ Ωcm with good precision, and undergoes little changes in volume resistivity and surface resistivity by change of environmental moisture.

Another object of the present invention is to provide a polyvinylidene fluoride resin composition having a high light transmittance, a low haze and excellent transparency.

A further object of the present invention is to provide various kinds of semiconductive and/or transparent formed or molded products such as tubes, sheets, fibers and injection-molded products using such a resin composition excellent in semiconductivity and/or transparency.

The present inventors have carried out an extensive investigation with a view toward overcoming the above-described problems involved in the prior art. As a result, it has been found that a resin composition obtained by adding an alkyl quaternary ammonium sulfate or sulfite to a polyvinylidene fluoride resin in a specific proportion is excellent in transparency, has a volume resistivity within a semiconductive region, is free of a scatter of volume resistivity with location and can stably achieve the desired volume resistivity with good precision. This resin composition also neither forms any aggregate or fish eye nor undergoes the bleeding of any additives. Further, the resin composition has good processability and can hence be formed into various formed or molded products by conventional melt processing techniques. The present invention has been led to completion on the basis of these findings.

According to the present invention, there is thus provided a polyvinylidene fluoride resin composition comprising 100 parts by weight of a polyvinylidene fluoride resin (A), and 0.03 to 10 parts by weight of at least one compound (B) selected from the group consisting of alkyl quaternary ammonium sulfates (B1) represented by the formula (1):

(1)

wherein $R^1$ to $R^4$ are alkyl groups which are the same or different from one another, and $R^5$ is an alkyl or fluoroalkyl group or a hydrogen atom, and alkyl quaternary ammonium sulfites (B2) represented by the formula (2):

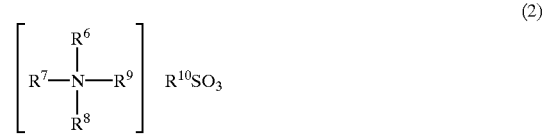

(2)

wherein $R^6$ to $R^9$ are alkyl groups which are the same or different from one another, and $R^{10}$ is an alkyl or fluoroalkyl group or a hydrogen atom.

DETAILED DESCRIPTION OF PREFERRED EMBODIMENTS

Polyvinylidene Fluoride Resin

Figure 1:
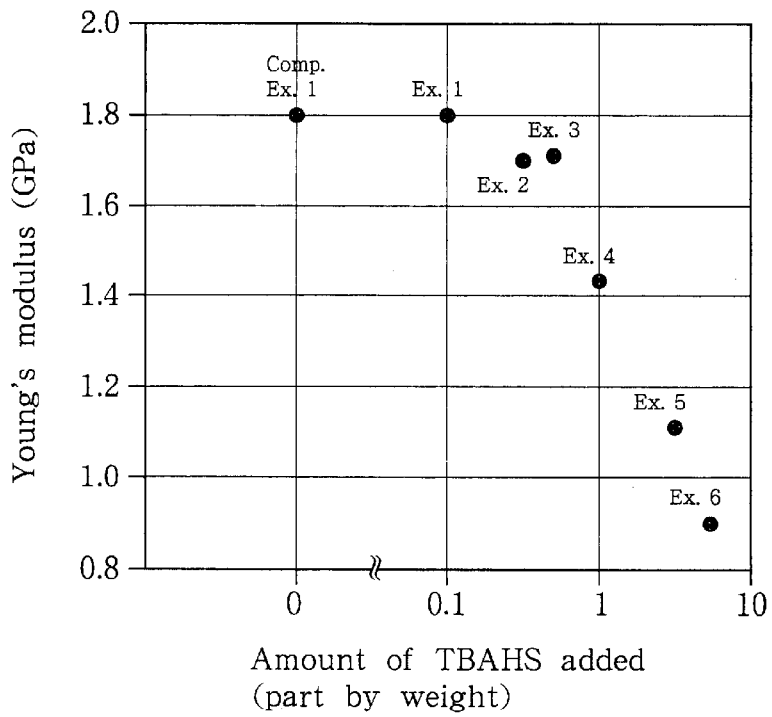
FIG. 1 diagrammatically illustrates the relationship between the Young's modulus of each of samples prepared in Examples 1 to 6 and Comparative Example 1 and the amount of tetrabutylammonium hydrogensulfate [TBAHS; $(C_4H_9)_4NHSO_4$] added.

As examples of the polyvinylidene fluoride resin (A) useful in the practice of the present invention, may be mentioned a homopolymer of vinylidene fluoride (i.e., polyvinylidene fluoride; PVDF) and copolymers of vinylidene fluoride and any other monomer copolymerizable therewith, comprising vinylidene fluoride as a principal structural unit. Preferable examples of the vinylidene fluoride copolymers include vinylidene fluoride-hexafluoropropylene copolymers, vinylidene fluoride-tetrafluoroethylene copolymers and vinylidene fluoride-tetrafluoroethylene-hexafluoropropylene copolymers. These polyvinylidene fluoride resins may be used either singly or in any combination thereof.

Among the polyvinylidene fluoride resins, PVDF, which is a homopolymer of vinylidene fluoride, is preferred from the viewpoints of stain resistance, ozone resistance and solvent resistance. From the viewpoints of flexibility and tear strength, it is preferred to use a vinylidene fluoride copolymer comprising vinylidene fluoride as a principal structural unit by itself or its blend with PVDF. In order to improve the adhesion property of the resulting resin composition, a vinylidene fluoride copolymer, into which a functional group has been introduced, is preferably used. The polyvinylidene fluoride resin may be used with another thermoplastic resin such as an acrylic resin or another fluorocarbon resin than the polyvinylidene fluoride resin blended therewith so far as no detrimental influence is thereby imposed on the objects of the present invention.

Alkyl Quaternary Ammonium Sulfate and Sulfite

The alkyl quaternary ammonium sulfates (B1) useful in the practice of the present invention is compounds represented by the formula (1):

(1)

wherein $R^1$ to $R^4$ are alkyl groups which are the same or different from one another, and $R^5$ is an alkyl or fluoroalkyl group or a hydrogen atom.

The alkyl quaternary ammonium sulfites (B2) useful in the practice of the present invention is compounds represented by the formula (2):

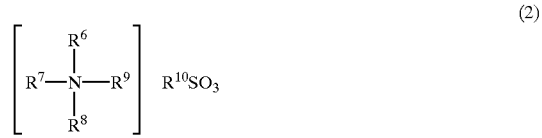

(2)

wherein $R^6$ to $R^9$ are alkyl groups which are the same or different from one another, and $R^{10}$ is an alkyl or fluoroalkyl group or a hydrogen atom. Of these compounds, the alkyl quaternary ammonium sulfates (B1) are preferred because they are excellent in stability.

In these compounds (B), the total number of carbon atoms of the alkyl groups is preferably 8 to 30, more preferably 12 to 24, most preferably 15 to 20. The examples of the alkyl groups may include short-chain alkyl groups such as methyl, ethyl, propyl, isopropyl, butyl, pentyl and hexyl groups. Examples of the fluoroalkyl groups may include short-chain fluoroalkyl groups such as $CF_3$ and $C_2F_5$.

Specific examples of these compounds (B) may include salts composed of an alkyl quaternary ammonium cation such as $(C_2H_5)_4N^+$, $(C_3H_7)_4N^+$, $(C_4H_9)_4N^+$ or $(C_5H_{11})_4N^+$ and an anion containing a sulfate or sulfite, such as $CF_3SO_4^-$, $CH_3SO_4^-$, $HSO_4^-$, $CF_3SO_3^-$, $CH_3SO^{3-}$ or $HSO_3^-$. These compounds (B) may be salts formed by combining two or more anions and cations. Four alkyl groups that the quaternary ammonium has are the same or different from one another. Of these, the alkyl quaternary ammonium hydrogensulfates are preferred, with tetrabutylammonium hydrogensulfate being particularly preferred. These compounds may be used either singly or in any combination thereof.

The polyvinylidene fluoride resins generally exhibit an α-structure when it is only melted and mixed with other substances, but their structure becomes a β-structure in the process of melting and mixing when an alkyl quaternary ammonium sulfate or sulfite is added thereto. Therefore, it is considered that these compounds act as β-type nucleating agents on the polyvinylidene fluoride resins.

Polyvinylidene Fluoride Resin Composition

The polyvinylidene fluoride resin compositions according to the present invention are resin compositions comprising the polyvinylidene fluoride resin (A) and the compound (B). A proportion of the compound (B) blended is within a range of from 0.03 to 10 parts by weight, preferably from 0.05 to 8 parts by weight, more preferably from 0.1 to 5 parts by weight, most preferably from 0.3 to 2 parts by weight, per 100 parts by weight of the polyvinylidene fluoride resin (A). If the proportion of the compound (B) is too low, the improving effect brought about by the addition thereof becomes little. If the proportion is too high, there is a possibility that coloring of the resin, and foaming by decomposition upon processing may occur in some cases. Incidentally, a preferable proportion of the compound (B) blended can be suitably determined according to physical properties required.

As disclosed in Japanese Patent Application Laid-Open Nos. 99374/1996 and 28266/1995, a transfer belt used in an electrophotographic copying machine, laser-beam printer or the like preferably has high elastic modulus. Specifically, the Young's modulus of the belt is preferably at least 1.0 GPa, with at least 1.5 GPa being particularly preferred. However, the Young's modulus of a sheet formed from the resin composition shows a tendency to extremely lower as the amount of the compound (B) added increases. Therefore, if such a resin composition is used in a charging belt of an image forming apparatus of the electrophotographic system, the charging belt elongates with time, which involves a problem that image drift occurs in a transfer step. Therefore, when the polyvinylidene fluoride resin composition according to the present invention is used as a transfer belt in an electrophotographic copying machine, laser-beam printer or the like, the proportion of the compound (B) blended is preferably from 0.03 to 5 parts by weight, more preferably from 0.1 to 3 parts by weight, still more preferably from 0.3 to 2 parts by weight, most preferably from 0.5 to 1 part by weight, per 100 parts by weight of the polyvinylidene fluoride resin (A).

When the polyvinylidene fluoride resin composition according to the present invention is used in fields of which transparency is required, and more specifically used as a surface-protecting material for office supplies, OA apparatus, building materials and sign boards by way of example, the absorbance ratio $R_\alpha$ of the resin composition as defined by the equation (I) is preferably at most 0.8, more preferably at most 0.5, still more preferably at most 0.3, most preferably at most 0.1. When the resin composition according to the present invention is used for optical lenses, optical fibers, optical filters and the like on the other hand, the $R_\alpha$ is preferably at most 0.5, more preferably at most 0.3, still more preferably at most 0.1, most preferably at most 0.05. $R_\alpha$ may be controlled to 0.02 or lower if desired.

Figure 3:
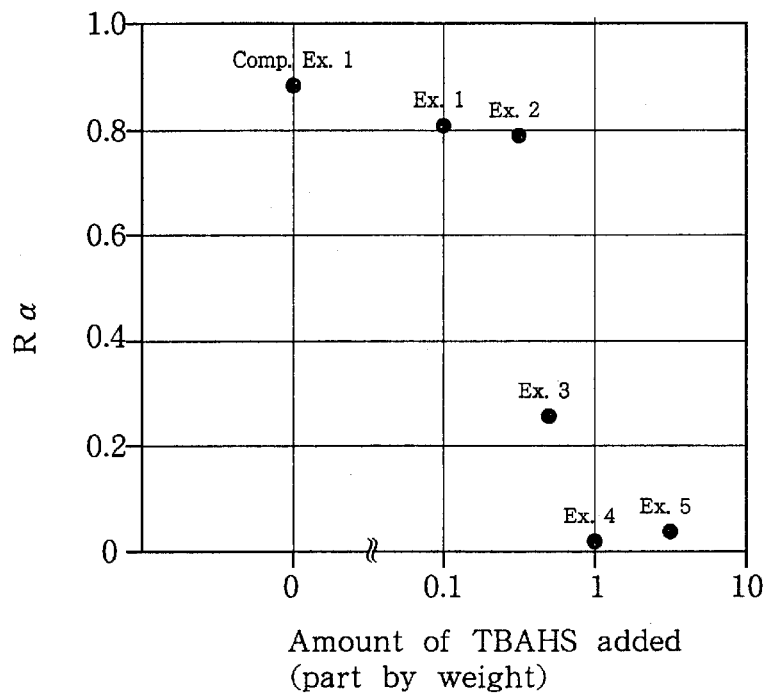
FIG. 3 diagrammatically illustrates the relationship between the $R_\alpha$ of each of the samples prepared in Examples 1 to 5 and Comparative Example 1 and the amount of TBAHS added.

The absorbance of the resin composition or a molded or formed product therefrom varies according to the monomer composition of the polyvinylidene fluoride resin (A), the kind and added amount of the compound (B), and whether stretch processing is conducted or not. Accordingly, the control of the absorbance ratio can be suitably conducted by selecting the kinds of the polyvinylidene fluoride resin (A) and the compound (B), adjusting the amount of the compound (B) added, controlling conditions for stretch processing or suitably combining these methods. For example, when the amount of the compound (B) added is increased as illustrated in FIG. 3, the absorbance ratio is lowered. Alternatively, for example, a sheet formed of the polyvinylidene fluoride resin composition is stretched as described in Example 11 or 12, which will be described subsequently, whereby the absorbance ratio can be markedly lowered. The adjustment of the amount of the compound (B) added and the stretching treatment may be combined with each other. The lower limit of the absorbance ratio is 0 when $D_\alpha$ is 0.

Other Additives

When the polyvinylidene fluoride resin compositions according to the present invention are used in the fields of which transparency is required, it is desirable that other additives should not be contained if possible. However, when used in the fields of which electrical conductivity is required, other additives may be added if desired. Examples of the other additives include particulate or powdery fillers such as talc, mica, silica, alumina, kaolin, ferrite, potassium titanate, titanium oxide, zinc oxide, iron oxide, magnesium hydroxide, calcium carbonate, nickel carbonate, calcium sulfate, barium sulfate, aluminum hydroxide, glass powder, quartz sand, graphite, inorganic pigments, organic metal salts and other metal oxides; and fibrous fillers such as carbon fiber, glass fiber, asbestos fiber, silica fiber, alumina fiber, zirconia fiber, boron nitride fiber, silicon nitride fiber, boron fiber and potassium titanate fiber. These fillers may be suitably incorporated as necessary for the end application intended so far as no detrimental influence is thereby imposed on the objects of the present invention.

Into the polyvinylidene fluoride resin compositions, may be suitably incorporated general-purpose additives, for example, antioxidants, lubricants, plasticizers, organic pigments, inorganic pigments, ultraviolet absorbents, surfactants, inorganic acids, organic acids, pH adjusters, crosslinking agents, coupling agents, etc. so far as no detrimental influence is thereby imposed on the effects of the present invention.

Preparation Process, Molding or Forming Process and Application Fields of the Resin Composition No particular limitation is imposed on the preparation process of the polyvinylidene fluoride resin compositions according to the present invention. However, examples of preferable processes include (i) a process in which powder or pellets of the polyvinylidene fluoride resin and the compound (B) are mixed in a mixing machine such as a mixer, (ii) a process in which the respective components are mixed in a mixing machine, and the mixture is then pelletized by a melt extrusion process, and (iii) a process in which the respective components are dissolved or dispersed in water or a mixed solvent of water and a water-soluble solvent, the resultant solution or dispersion is mixed in a mixing machine such as a mixer and then dried, and the resultant dry product is melt-extruded into pellets.

The polyvinylidene fluoride resin compositions according to the present invention can be formed into various formed or molded products and coated products in accordance with various forming or molding processes such as press molding, melt extrusion, injection molding, solution casting and coating processes. It is also permissible to prepare a master batch in advance by incorporating the compound (B) at a high concentration into the polyvinylidene fluoride resin, dilute the master batch with the resin to a concentration of the compound (B) required upon forming or molding, and then conduct the forming or molding and processing.

When the polyvinylidene fluoride resin composition according to the present invention is extruded into a seamless belt, a continuous melt extrusion process is preferably used. As a preferable continuous melt extrusion process of the seamless belt, may be mentioned a process in which a single-screw extruder and a spiral ring die are used to extrude the resin composition directly under the die from a die lip, and the extrudate is taken up while controlling the inner diameter of the extrudate by an internal cooling mandrel system.

When the polyvinylidene fluoride resin composition according to the present invention is used to produce a sheet, as a continuous extrusion process, may be mentioned a process in which a single-screw or twin-screw extruder and a T-die are used to extrude the resin composition in the molten state directly under the die from a die lip, and the extrudate is cooled and solidified while bringing it into close contact with a cooling drum by an air knife or the like.

In order to solidify the polyvinylidene fluoride resin composition according to the present invention in a molten state, it is preferred to control a cooling temperature within a range of from −30 to 100° C., particularly from 0 to 30° C.

The polyvinylidene fluoride resin compositions according to the present invention are suitably used for antistatic films and antistatic containers for packaging electronic parts, anti-dust-collecting members used in various OA apparatus, static charge eliminating members, conductive members, lenses, optical filters, transparent films, transparent containers, etc. No particular limitation is imposed on the forming or molding process of the polyvinylidene fluoride resin compositions according to the present invention. They may be formed and processed into, for example, sheets and fibers by the publicly known processes such as injection molding and melt extrusion. After the processing, the obtained products may be further stretched and heat set. The polyvinylidene fluoride resin compositions according to the present invention may be used either singly or in the form of laminate sheets or composite filaments in combination with other resin layers or the like as needed.

ADVANTAGES OF THE INVENTION

According to the present invention, there is provided a polyvinylidene fluoride resin composition which can stably and uniformly achieve a desired volume resistivity within a range of $10^5$–$10^{13}$ Ωcm with good precision, and undergoes little changes in volume resistivity and surface resistivity by change of environmental moisture. This polyvinylidene fluoride resin composition can be used to obtain semiconductive formed or molded products such as tubes, sheets, fibers and injection-molded products. According to the present invention, there is also provided a polyvinylidene fluoride resin composition having a low haze and excellent transparency. This polyvinylidene fluoride resin composition can be used to obtain transparent formed or molded products such as tubes, sheets, fibers and injection-molded products.

The polyvinylidene fluoride resin compositions according to the present invention are suitable for.use, in the fields of which electrical conductivity is required, as materials for forming at least surface layers of charge controlling members such as charging rolls, transfer rolls, developing rolls, charging belts, static charge eliminating belts and the like in image forming apparatus of the electrophotographic system. Roll-like mimbers include those as the outermost layer of which a layer of the polyvinylidene fluoride resin composition is formed directly or through another resin layer and/or a rubber layer on a core bar. The resin compositions according to the present invention are also suitable for use as various kinds of charge controlling members such as packaging materials (for example, films, bags and containers) for electronic parts, wall paper, sheathing materials for OA apparatus, anti-static partitions, conveyor tubes for powder coatings, and the like. Further, the polyvinylidene fluoride resin compositions according to the present invention are suitable for use, in the fields of which transparency is required, as optical members such as optical fibers, sheath components for optical fibers, optical lenses, window glass, protective materials for window glass, protective materials for displays, protective materials for CRT, light-transmitting materials for solar cells, and lightening covers.

EMBODIMENTS OF THE INVENTION

The present invention will hereinafter be described ore specifically by the following Examples and Comparative Examples. Physical properties in the examples were measured in accordance with the following respective methods:

(1) Thickness Measurement:

The thickness of each molded or formed product sample was measured by a dial gauge thickness meter (DG-911, trade name, manufactured by Ono Sokki K.K.).

(2) Volume Resistivity:

In the present invention, with respect to a sample having a volume resistivity of at least $10^{10}$ Ωcm, the sample was held in a resistivity cell (HP16008B, trade name, manufactured by Hewlett Packard Co.) having ring electrodes (diameter of an inner electrode: 26.0 mm; inner diameter of an outer electrode: 38.0 mm; outer diameter of the outer electrode: 40.0 mm) under a load of 7 kg-weight (=68.6N), and a volume resistivity ρv of the sample when applying voltage of 1 kV for 1 minute between the inner electrode and a counter electrode in a direction of the thickness of the sample was measured by a resistance meter (High Resistance Meter HP4339A, trade name, manufactured by Hewlett Packard Co.). The details of the volume resistivity measuring method by such a ring electrode method may be referred to JIS K 6911.

In the present invention, with respect to a sample having a volume resistivity lower than $10^{10}$ Ωcm, the sample was held between a ring probe (HRS Probe, trade name, manufactured by Mitsubishi Kagaku Co., Ltd.; diameter of an inner electrode: 5.9 mm; inner diameter of an outer electrode: 11.0 mm; outer diameter of the outer electrode: 17.8 mm) and a measuring stage (Resitable FL, trade name, manufactured by Mitsubishi Kagaku Co., Ltd.) to press the sample under a pressure of about 3 kg-weight (=29.4N), and voltage of 500 V was applied between the inner electrode of the probe and the measuring stage to measure a volume resistivity ρv of the sample by a volume resistivity meter (Hiresta IP, trade name, manufactured by Mitsubishi Kagaku Co., Ltd.). The details of the volume resistivity measuring method by such a ring electrode method may be referred to JIS K 6911.

(3) Calculation of Average Value:

In the above-described measurements of the thickness and volume resistivity, the measurements were conducted either at optionally selected 20 measuring points per $m^2$ of the surface area of a sample to be measured, or at one measuring point (20 points in total) per one of optionally selected 20 molded or formed samples to find the maximum values, minimum values and average values (arithmetic mean) thereof.

(4) Young's Modulus:

The measurement was conducted by using a strip specimen 10 mm in width and 100 mm in length by means of a tensile tester (TENSILON RTM100 Model, trade name, manufactured by Orientec K.K.) under conditions of a crosshead speed of 50 mm/min and an interchuck interval of 50 mm in accordance with JIS K 7113.

(5) Dependency of Volume Resistivity on Humidity:

In the present invention, a sample was held in a resistivity cell (HP16008B, trade name,.manufactured by Hewlett Packard Co.) having ring electrodes (diameter of an inner electrode: 26.0 mm; inner diameter of an outer electrode: 38.0 mm; outer diameter of the outer electrode: 40.0 mm) under a load of 7 kg-weight (=68.6N), and left to stand for 24 hours in a thermo-hygrostatic chamber (LH30-13M, trade name, manufactured by Nagano Kagaku Kikai Seisakusho K.K.) controlled at a predetermined temperature and humidity, and a volume resistivity ρv of the sample when applying voltage of 100 V for 1 minute between the inner electrode and a counter electrode in a direction of the thickness of the sample was then measured by a resistance meter (High Resistance Meter HP4339A, trade name, manufactured by Hewlett Packard Co.). The details of the volume resistivity measuring method by such a ring electrode method may be referred to JIS K 6911.

The volume resistivity was respectively measured in environments of 30%, 50%, 70% and 90% relative humidity after controlling the humidity for 24 hours in that order.

(6) Dependency of Surface Resistivity on Humidity:

In the present invention, a sample was held in a resistivity cell (HP16008B, trade name, manufactured by Hewlett Packard Co.) having ring electrodes (diameter of an inner electrode: 26.0 mm; inner diameter of an outer electrode: 38.0 mm; outer diameter of the outer electrode: 40.0 mm) under a load of 7 kg-weight (=68.6N), and left to stand for 24 hours in a thermo-hygrostatic chamber (LH30-13M, trade name, manufactured by Nagano Kagaku Kikai Seisakusho K.K.) controlled at a predetermined temperature and humidity, and a surface resistivity ρs of the sample when applying voltage of 10 V for 1 minute between the inner electrode and the outer electrode in a direction of the surface of the sample was then measured by a resistance meter (High Resistance Meter HP4339A, trade name, manufactured by Hewlett Packard Co.). The details of the surface resistivity measuring method by such a ring electrode method may be referred to JIS K 6911.

The surface resistivity was respectively measured in environments of 30%, 50%, 70% and 90% relative humidity after controlling the humidity for 24 hours in that order.

(7) Haze:

The haze of each sample was measure by means of a haze meter (Σ80, trade name, manufactured by Nippon Denshoku Kogyo K.K.). The details of the haze measuring method may be referred to JIS K 7015.

(8) Infrared Absorption Spectrum (IR):

The infrared absorption spectrum of each sample was determined in a range of from 400 cm$^{-1}$ to 1,000 cm$^{-1}$ by means of a Fourier transform infrared spectrophotometer (FTIR-8200, trade name, manufactured by Shimadzu Corporation), a total reflection measuring cell (ATR-8000, trade name, manufactured by Shimadzu Corporation) and a prism (KRS-5, trade name, manufactured by Shimadzu Corporation) in accordance with the ATR (Attenuated Total Reflectance) method.

(9) Absorbance Ratio $R_\alpha$:

The absorbande ratio $R_\alpha$ of each sample was found from the absorbance $D_\alpha$ of an infrared absorption spectrum at 531 cm$^{-1}$ and the absorbance $D_\beta$ of an infrared absorption spectrum at 511 cm$^{-1}$ in the sample in accordance with the equation (I):

$$R_\alpha = D_\alpha/(D_\alpha + D_\beta) \quad (I)$$

Provided that the absorbance $D_x$ of an infrared absorption spectrum at x cm$^{-1}$ is found from the intensity $I_0$ of incident light at x cm$^{-1}$ and the intensity I of transmitted light in accordance with the equation (II):

$$D_x = \log_{10}(I_0/I) \quad (II)$$

Figure 8:
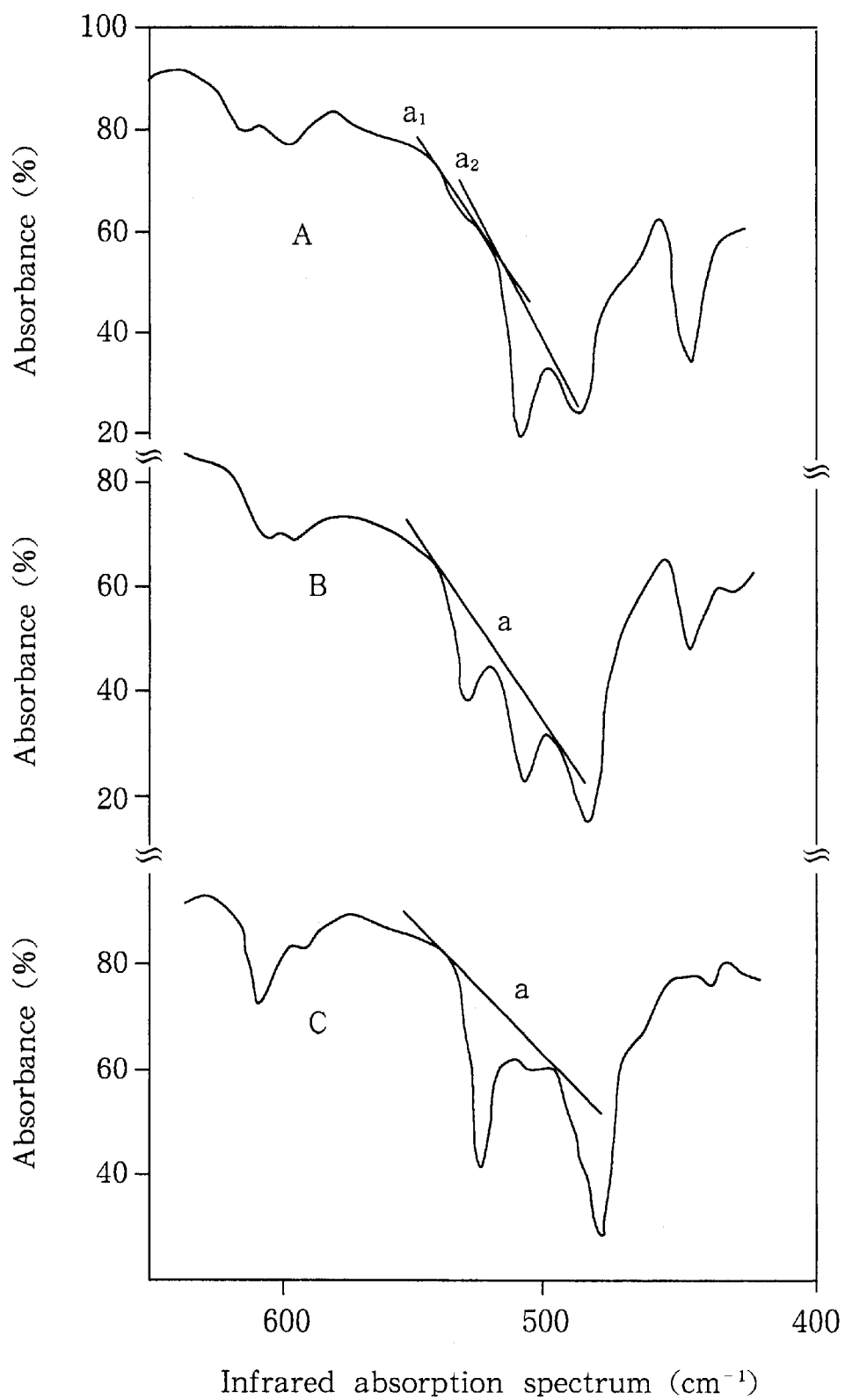
FIG. 8 diagrammatically illustrates the determination method of a base line for finding an absorbance of an infrared absorption spectrum.

Incidentally, a base line for finding the absorbance was determined by drawing a tangential line on crests situated at about 500 cm$^{-1}$ and about 545 cm$^{-1}$ as illustrated in B and C of FIG. 8, or in the case where $D_\beta$ is extremely great, by drawing a tangential line $a_1$ coming into contact with crests situated at about 545 cm$^{-1}$ and about 520 cm$^{-1}$ and a tangential line $a_2$ coming into contact with crests situated at about 520 cm$^{-1}$ and about 500 cm$^{-1}$ as illustrated in A of FIG. 8 since a tangential line drawn in the first mentioned manner is crossed with the crest situated at about 520 cm$^{-1}$. The $D_\alpha$ and $D_\beta$ are found on the basis of this base line.

(10) Differential Scanning Calorimetry (DSC):

The measurement was conducted by means of a differential scanning calorimeter (DSC30, trade name, manufactured by Mettler Instrument AG) and a data processor (TC10A, trade name, manufactured by Mettler Instrument AG) under the following conditions in accordance with the DSC method.

Conditions:
  sample weight: 10 mg;
  measurement starting temperature: 30° C.;
  measurement completing temperature: 250° C.; and
  heating rate: 10° C./min.

Examples 1 to 7 and Comparative Examples 2 to 6

Resin powders and additives of their corresponding compositions shown in Table 1 were respectively charged into a mixing machine (Super Mixer, trade name, manufactured by Kawada Seisakusho K.K.) to thoroughly stir and mix them for 5 minutes at 1,000 rpm. Each of the resultant mixtures was then formed into pellets having a diameter of about 3 mm by means of a single-screw extruder (manufactured by Pla Giken K.K.) at a die temperature of 240° C. The pellets thus obtained were press-molded at 230° C. and quenched at 20° C. directly after that to obtain a sheet having a thickness of 0.25 mm. The measurement results of physical properties are shown in Table 1.

EXAMPLE 8

A sheet having a thickness of 0.25 mm was obtained in the same manner as in Examples 1 to 7 except that resin powder and an additive of its corresponding composition shown in Table 1 were used, and the press-molded article was slowly cooled at 100° C. directly after that.

EXAMPLES 9 AND 10

Resin powders and additives of their corresponding compositions shown in Table 1 were respectively charged into a mixing machine (Super Mixer, trade name, manufactured by Kawada Seisakusho K.K.) to thoroughly stir and mix them for 5 minutes at 1,000 rpm. Each of the resultant mixtures was then formed into pellets having a diameter of about 5 mm by means of a single-screw extruder (manufactured by Pla Giken K.K.) at a die temperature of 240° C. The thus-pelletized material was fed to a T-die (die temperature: 240° C.) having a lip clearance of 0.7 mm using a single-screw extruder (manufactured by Pla Giken K.K.), and a molten resin extruded from the die was cooled on a cooling roll controlled at 90° C. to form a sheet. The measurement results of physical properties are shown in Table 1.

EXAMPLE 11

The sheet obtained in Example 10 was stretched 3.5 times in a machine direction by a tenter clip type stretching machine controlled at 140° C. to obtain a uniaxially oriented film having a thickness of 35 μm. The absorbance ratio, $R_\alpha$ of this film was 0.05. The measurement results of physical properties are shown in Table 1.

EXAMPLE 12

The sheet obtained in Example 10 was stretched 3.5 times in a machine direction and further 3.5 times in a transverse direction by a tenter clip type stretching machine controlled at 140° C. to obtain a biaxially oriented film having a thickness of 10 μm. The absorbance ratio, $R_\alpha$ of this film was 0.02. The measurement results of physical properties are shown in Table 1.

COMPARATIVE EXAMPLE 1

Pellets of PVDF were press-molded at 230° C. and then quenched at 20° C. to obtain a sheet having a thickness of 0.25 mm. The measurement results of physical properties are shown in Table 1.

COMPARATIVE EXAMPLE 7

Pellets of PVDF were fed to a T-die (die temperature: 240° C.) having a lip clearance of 0.7 mm using a single-screw extruder (manufactured by Pla Giken K.K.), and a molten resin extruded from the die was cooled on a cooling roll controlled at 90° C. to form a sheet. The measurement results of physical properties are shown in Table 1.

COMPARATIVE EXAMPLE 8

The sheet obtained in Comparative Example 7 was stretched 3.5 times in a machine direction by a tenter clip type stretching machine controlled at 140° C. to obtain a uniaxially oriented film having a thickness of 35 μ. The absorbance ratio, $R_\alpha$ of this film was 0.97. The measurement results of physical properties are shown in Table 1.

COMPARATIVE EXAMPLE 9

The sheet obtained in Comparative Example 7 was stretched 3.5 times in a machine direction and further 3.5 times in a transverse direction by a tenter clip type stretching machine controlled at 140° C. to obtain a biaxially oriented film having a thickness of 10 μm. The absorbance ratio, $R_\alpha$ of this film was 0.59. The measurement results of physical properties are shown in Table 1.

(6) TEACl: $(C_2H_5)_4NCl$ (product of Wako Pure Chemical Industries, Ltd.)
(7) MACl: $CH_3NH_3Cl$ (product of Wako Pure Chemical Industries, Ltd.).

As apparent from the results shown in Table 1, the polyvinylidene fluoride resin compositions (Examples 1 to 10) according to the present invention are moderately low in volume resistivity, narrow in scatter of volume resistivity and low in haze. According to the polyvinylidene fluoride resin compositions of the present invention, their haze values can be made significantly low by selecting proportions of the components blended and forming or molding conditions (Examples 4 to 10). Further, in Examples 1 to 10, neither aggregate and fish eye nor bleed-out of additives were observed in all the samples.

On the other hand, in the cases where no additive is contained (Comparative Examples 1 and 7), where a proportion of the compound (B) blended is too high (Comparative Example 2), and where other additives than the compound (B) according to the present invention are added (Comparative Examples 3 to 6), unsatisfactory results can be only achieved in all the cases. In Comparative

TABLE 1

| | Composition (part by weight) | | Volume resistivity (Ω cm) | | | Haze |
|---|---|---|---|---|---|---|
| | Resin | Additive | Average | Maximum | Minimum | (%) |
| Ex. 1 | PVDF(100) | TBAHS(0.1) | $1.3 \times 10^{11}$ | $1.8 \times 10^{11}$ | $9.7 \times 10^{10}$ | 39.9 |
| Ex. 2 | PVDF(100) | TBAHS(0.3) | $3.6 \times 10^{10}$ | $4.9 \times 10^{10}$ | $2.9 \times 10^{10}$ | 38.1 |
| Ex. 3 | PVDF(100) | TBAHS(0.5) | $2.9 \times 10^{10}$ | $3.2 \times 10^{10}$ | $1.4 \times 10^{10}$ | 35.8 |
| Ex. 4 | PVDF(100) | TBAHS(1.0) | $6.3 \times 10^{9}$ | $8.8 \times 10^{9}$ | $4.0 \times 10^{9}$ | 4.9 |
| Ex. 5 | PVDF(100) | TBAHS(3.0) | $1.8 \times 10^{9}$ | $2.4 \times 10^{9}$ | $1.2 \times 10^{9}$ | 2.8 |
| Ex. 6 | PVDF(100) | TBAHS(5.0) | $1.2 \times 10^{9}$ | $2.0 \times 10^{9}$ | $9.1 \times 10^{8}$ | 4.5 |
| Ex. 7 | VDFP(100) | TBAHS(1.0) | $1.0 \times 10^{9}$ | $1.6 \times 10^{9}$ | $8.7 \times 10^{8}$ | 2.0 |
| Ex. 8 | PVDF(100) | TBAHS(1.0) | $1.0 \times 10^{11}$ | $2.2 \times 10^{11}$ | $7.9 \times 10^{10}$ | 10.4 |
| Ex. 9 | PVDF(100) | TBAHS(0.3) | $2.8 \times 10^{11}$ | $3.5 \times 10^{11}$ | $1.8 \times 10^{11}$ | 8.5 |
| Ex. 10 | PVDF(100) | TBAHS(1.0) | $5.3 \times 10^{10}$ | $7.0 \times 10^{10}$ | $4.3 \times 10^{10}$ | 1.3 |
| Ex. 11 | PVDF(100) | TBAHS(1.0) | $1.2 \times 10^{12}$ | $2.7 \times 10^{12}$ | $8.3 \times 10^{11}$ | 1.0 |
| Ex. 12 | PVDF(100) | TBAHS(1.0) | $2.0 \times 10^{12}$ | $4.1 \times 10^{12}$ | $1.1 \times 10^{12}$ | 0.2 |
| Comp. Ex. 1 | PVDF(100) | — | $3.0 \times 10^{14}$ | $4.8 \times 10^{14}$ | $2.1 \times 10^{14}$ | 46.4 |
| Comp. Ex. 2 | PVDF(100) | TBAHS(15) | $8.0 \times 10^{8}$ | $3.5 \times 10^{9}$ | $2.6 \times 10^{8}$ | 25.5 |
| Comp. Ex. 3 | PVDF(100) | TEABr(1.0) | $5.4 \times 10^{12}$ | $1.1 \times 10^{13}$ | $2.4 \times 10^{12}$ | 53.7 |
| Comp. Ex. 4 | PVDF(100) | TBABr(1.0) | $2.7 \times 10^{11}$ | $5.6 \times 10^{11}$ | $1.3 \times 10^{11}$ | 43.1 |
| Comp. Ex. 5 | PVDF(100) | TEACl(1.0) | $6.8 \times 10^{12}$ | $1.3 \times 10^{13}$ | $4.3 \times 10^{12}$ | 59.5 |
| Comp. Ex. 6 | PVDF(100) | MACl(1.0) | $2.2 \times 10^{12}$ | $4.5 \times 10^{12}$ | $1.0 \times 10^{12}$ | 58.0 |
| Comp. Ex. 7 | PVDF(100) | — | $2.4 \times 10^{14}$ | $4.2 \times 10^{14}$ | $1.8 \times 10^{14}$ | 42.6 |
| Comp. Ex. 8 | PVDF(100) | — | $5.2 \times 10^{14}$ | $7.7 \times 10^{14}$ | $2.3 \times 10^{14}$ | 4.6 |
| Comp. Ex. 9 | PVDF(100) | — | $8.1 \times 10^{14}$ | $2.8 \times 10^{15}$ | $3.7 \times 10^{14}$ | 3.2 |

Note:
(1) PVDF: polyvinylidene fluoride (KF#1000, trade name, product of Kureha Kagaku Kogyo K.K.)
(2) VDFP: vinylidene fluoride-propylene hexafluoride copolymer (KF#2300, trade name, product of Kureha Kagaku Kogyo K.K.)
(3) TBAHS: $(C_4H_9)_4NHSO_4$ (product of Tomiyama Pure Chemical Industries, Ltd.)
(4) TEABr: $(C_2H_5)_4NBr$ (product of Wako Pure Chemical Industries, Ltd.)
(5) TBABr: $[(CH_3)(CH_2)_3]_4NBr$ (product of Wako Pure Chemical Industries, Ltd.)

Examples 2 to 6 in particular, the resin compositions were colored in brown and underwent foaming by decomposition upon pelletization. Accordingly, the physical properties of Comparative Examples 2 to 6 shown in Table 1 are measured values as to colored foamed sheets. The pressed sheets obtained in Comparative Examples 3 to 6 gave out an odor of ammonia.

Measurement of Young's Modulus:

Each of the samples prepared in Examples 1 to 6 and Comparative Example 1 was used to measure its Young's modulus. The results are illustrated in FIG. 1. As apparent from FIG. 1, the Young's modulus of the sheet sample shows a tendency to rapidly lower as the amount of TBAHS added increases.

Figure 2:
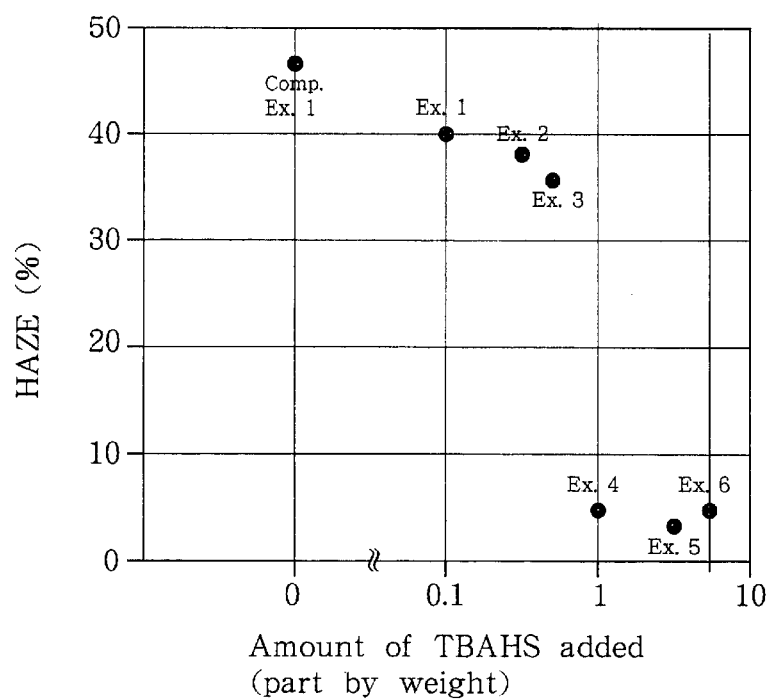
FIG. 2 diagrammatically illustrates the relationship between the haze of each of the samples prepared in Examples 1 to 6 and Comparative Example 1 and the amount of TBAHS added.

Measurement of Haze:

Each of the samples prepared in Examples 1 to 6 and Comparative Example 1 was used to measure its haze. The results are illustrated in FIG. 2. As apparent from FIG. 2, the haze of the sheet sample shows a tendency to rapidly lower to enhance transparency as the amount of TBAHS added increases.

Determination of $R_\alpha$:

Each of the samples prepared in Examples 1 to 5 and Comparative Example 1 was used to determine its $R_\alpha$. The results are illustrated in FIG. 3. As apparent from FIG. 3, the $R_\alpha$ of the sheet sample shows a tendency to rapidly lower as the amount of TBAHS added increases.

Figure 4:
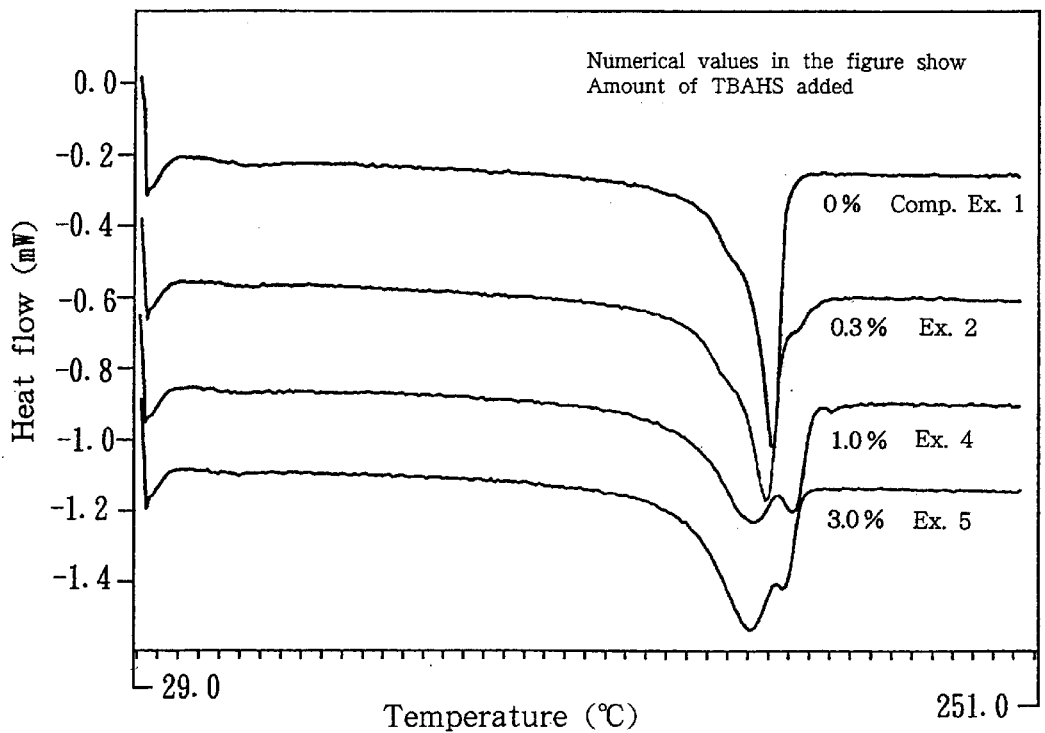
FIG. 4 diagrammatically illustrates the results of the DSC measurement of the samples prepared in Examples 2, 4 and 5, and Comparative Example 1.

DSC Measurement 1:

Each of the samples prepared in Examples 2, 4 and 5, and Comparative Example 1 was used to conduct its DSC measurement. The results are illustrated in FIG. 4. As apparent from FIG. 4, a peak not appeared in Comparative Example 1 is observed in a range of 185 to 200° C. on the DSC charts of Examples 2, 4 and 5.

Figure 5:
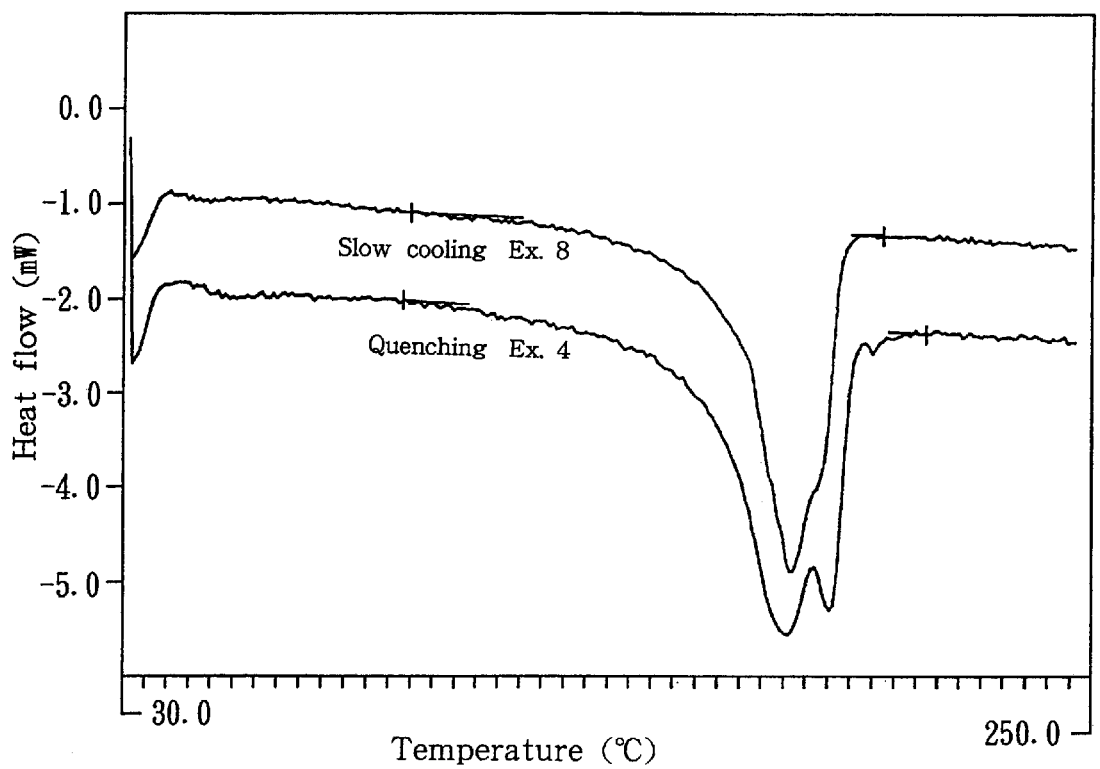
FIG. 5 diagrammatically illustrates the results of the DSC measurement of samples prepared in Examples 4 and 8.

DSC Measurement 2:

Each of the samples prepared in Examples 4 and 8 was used to conduct its DSC measurement. The results are illustrated in FIG. 5. As apparent from FIG. 5, a peak appeared in a range of 185 to 200° C. in Example 4 disappears on the DSC chart of Example 8 in which the molded product was slowly cooled after the press molding.

Figure 6:
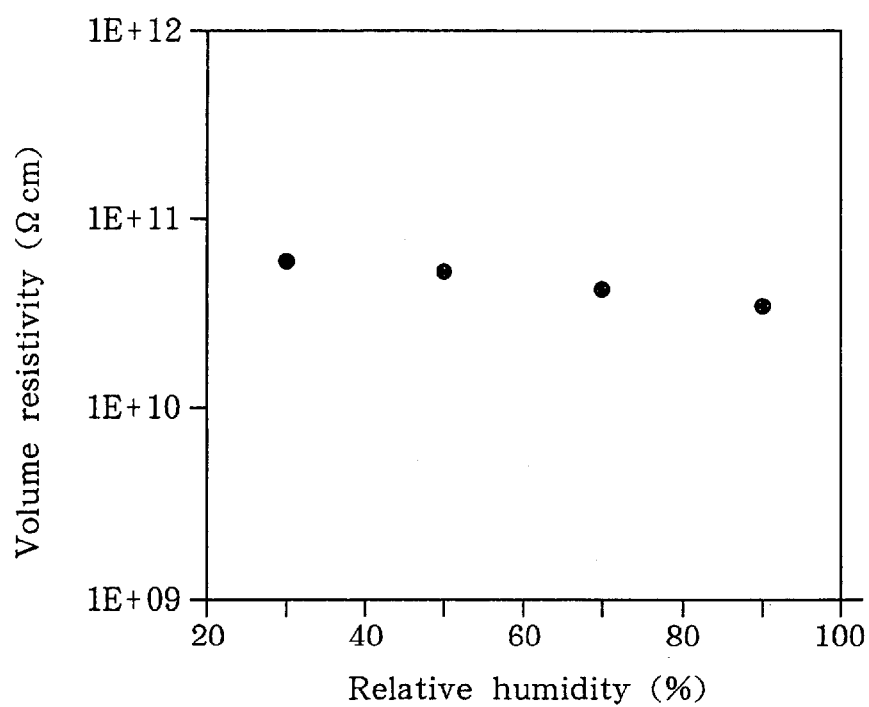
FIG. 6 diagrammatically illustrates the relationship between the volume resistivity of a sample prepared in Example 10 and humidity.

Measurement of Volume Resistivity:

The sample prepared in Example 10 was used to determine the dependency of its volume resistivity on humidity. The result is illustrated in FIG. 6. As apparent from FIG. 6, the sheet sample obtained from the polyvinylidene fluoride resin composition according to the present invention is low in the dependency of its volume resistivity on humidity.

Figure 7:
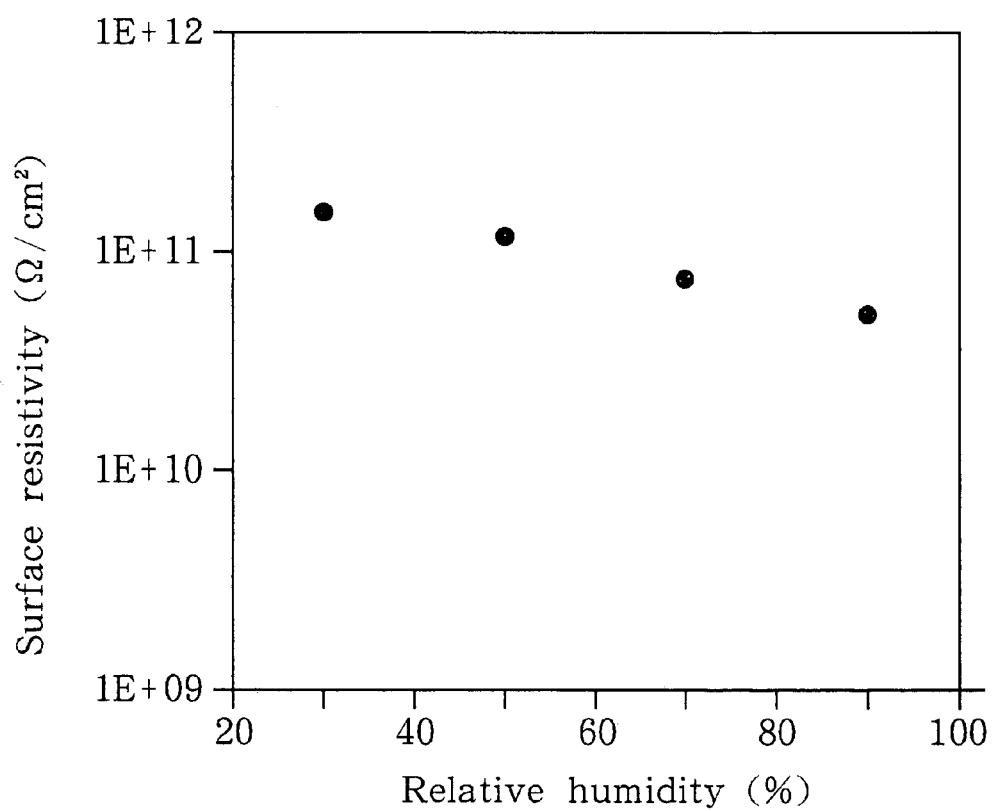
FIG. 7 diagrammatically illustrates the relationship between the surface resistivity of the sample prepared in Example 10 and humidity.

Measurement of Surface Resistivity:

The sample prepared in Example 10 was used to determine the dependency of its surface resistivity on humidity. The result is illustrated in FIG. 7. As apparent from FIG. 7, the sheet sample obtained from the polyvinylidene fluoride resin composition according to the present invention is low in the dependency of its surface resistivity on humidity.

What is claimed is:

1. A polyvinylidene fluoride resin composition comprising 100 parts by weight of a homopolymer of vinylidene fluoride (A), and 0.03 to 10 parts by weight of at least one compound (B) selected from the group consisting of alkyl quaternary ammonium sulfates (B1) represented by the formula (1):

(1)

wherein $R^1$ to $R^4$ are alkyl groups which are the same or different from one another, and $R^5$ is an alkyl or fluoroalkyl group or hydrogen atom, and alkyl quaternary ammonium sulfites (B2) represented by the formula (2):

(2)

wherein $R^6$ to $R^9$ are alkyl groups which are the same or different from one another, and $R^{10}$ is an alkyl or fluoroalkyl group or hydrogen atom, wherein said resin composition has a volume resistivity within a range of $10^5$–$10^{13}$ Ωcm.

2. The resin composition according to claim 1, wherein the alkyl quaternary ammonium sulfate (B1) is an alkyl quaternary ammonium hydrogensulfate.

3. The resin composition according to claim 2, wherein the alkyl quaternary ammonium hydrogensulfate is tetrabutylammonium hydrogensulfate.

4. The resin composition according to claim 1, which has a haze of at most 40%.

5. The resin composition according to claim 1, which has an absorbance ratio $R_\alpha$, which is defined by the equation (I):

$$R_\alpha = D_\alpha/(D_\alpha + D_\beta) \qquad (I)$$

wherein $D_\alpha$ is an absorbance of an infrared absorption spectrum at 531 cm$^{-1}$, and $D_\beta$ is an absorbance of an infrared absorption spectrum at 511 cm$^{-1}$, ranging from 0 to 0.8.

6. The resin composition according to claim 1, which exhibits at least one endothermic peak within a temperature range of 185–200° C. as measured under conditions of a heating starting temperature of 30° C. and a heating rate of 10° C./min using a differential scanning calorimeter.

7. The resin composition according to claim 1, which is a resin material used in a charge controlling member for an electrophotographic apparatus or electrostatic recording apparatus.

8. A formed or molded product of a polyvinylidene fluoride resin composition comprising 100 parts by weight of a homopolymer of vinylidene fluoride (A), and 0.03 to 10 parts by weight of at least one compound (B) selected from the group consisting of alkyl quaternary ammonium sulfates (B1) represented by the formula (1):

(1)

wherein $R^1$ to $R^4$ are alkyl groups which are the same or different from one another, and $R^5$ is an alkyl or fluoroalkyl group or hydrogen atom, and alkyl quaternary ammonium sulfites (B2) represented by the formula (2):

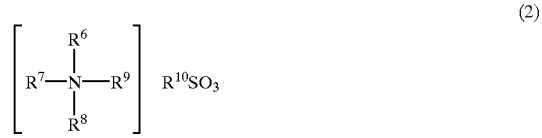
(2)

wherein $R^6$ to $R^9$ are alkyl groups which are the same or different from one another, and $R^{10}$ is an alkyl or fluoroalkyl group or hydrogen atom, wherein said resin composition has a volume resistivity within a range of $10^5$–$10^{13}$ Ωcm.

9. The formed or molded product according to claim 8, which is a sheet, fiber or injection-molded product.

10. The formed or molded product according to claim 8, which is a charge controlling member.

11. The formed or molded product according to claim 10, wherein the charge controlling member is a semiconductive member in an electrophotographic apparatus or electrostatic recording apparatus.

12. The formed or molded product according to claim 11, wherein the charge controlling member is a belt-like or sheet-like member having a Young's modulus of at least 1.0 GPa.

13. The formed or molded product according to claim 11, which is a roll-like member having a surface layer formed from the polyvinylidene fluoride resin composition.

14. The formed or molded product according to claim 10, wherein the charge controlling member is a packaging material for electronic parts, wall paper, sheathing material for OA apparatus, anti-static partition, or conveyor tube for powder coatings.

15. The formed or molded product according to claim 8, which is an optical member.

16. The formed or molded product according to claim 10, wherein the optical member is an optical fiber, sheath component for optical fibers, optical lens, window glass, protective material for window glass, protective material for displays, protective material for CRT, light-transmitting material for solar cells, or lightening cover.

17. A polyvinylidene fluoride resin composition comprising 100 parts by weight of a polyvinylidene fluoride resin (A), and 0.03 to 10 parts by weight of at least one compound (B) selected from the group consisting of alkyl quaternary ammonium sulfates (B1) represented by the formula (1):

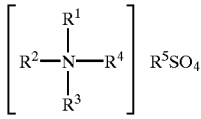

(1)

wherein $R^1$ to $R^4$ are alkyl groups which are the same or different from one another, and $R^5$ is an alkyl or fluoroalkyl group or hydrogen atom, and alkyl quaternary ammonium sulfites (B2) represented by the formula (2):

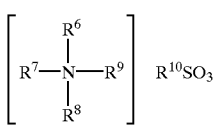

(2)

wherein $R^6$ to $R^9$ are alkyl groups which are the same or different from one another, and $R^{10}$ is an alkyl or fluoroalkyl group or hydrogen atom, wherein said resin composition has a volume resistivity within a range of $10^5$–$10^{13}$ Ωcm, and wherein said composition has a haze of at most 40%.

18. A formed or molded product of a polyvinylidene fluoride resin composition comprising 100 parts by weight of a polyvinylidene fluoride resin (A), and 0.03 to parts by weight of at least one compound (B) selected from the group consisting of alkyl quaternary ammonium sulfates (B1) represented by the formula (1):

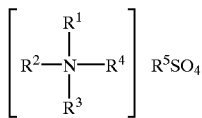

(1)

wherein $R^1$ to $R^4$ are alkyl groups which are the same or different from one another, and $R^5$ is an alkyl or fluoroalkyl group or hydrogen atom, and alkyl quaternary ammonium sulfites (B2) represented by the formula (2):

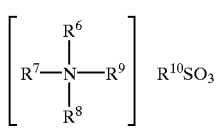

(2)

wherein $R^1$ to $R^4$ are alkyl groups which are the same or different from one another, and $R^{10}$ is an alkyl or fluoroalkyl group or hydrogen atom, wherein said composition has a volume resistivity within a range of $10^5$–$10^{13}$ Ωcm, and wherein said composition has a haze of at most 40%.

19. A polyvinylidene fluoride resin composition comprising 100 parts by weight of a polyvinylidene fluoride resin (A), and 0.03 to 10 parts by weight of at least one compound (B) selected from the group consisting of alkyl quaternary ammonium sulfates (B1) represented by the formula (1):

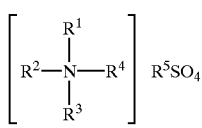

(1)

wherein $R^1$ to $R^4$ are alkyl groups which are the same or different from one another, and $R^5$ is an alkyl or fluoroalkyl group or hydrogen atom, and alkyl quaternary ammonium sulfites (B2) represented by the formula (2):

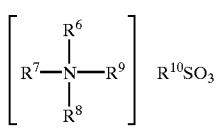

(2)

wherein $R^6$ to $R^9$ are alkyl groups which are the same or different from one another, and $R^{10}$ is an alkyl or fluoroalkyl group or hydrogen atom, wherein said composition has a volume resistivity within a range of $10^5$–$10^{13}$ Ωcm, and wherein said composition exhibits at least one endothermic peak within a temperature range of 185–200° C. as measured under conditions of a heating starting temperature of 30° C. and a heating rate of 10° C./min using a differential scanning calorimeter.

20. A formed or molded product of a polyvinylidene fluoride resin composition comprising 100 parts by weight of a polyvinylidene fluoride resin (A), and 0.03 to 10 parts by weight of at least one compound (B) selected from the group consisting of alkyl quaternary ammonium sulfates (B1) represented by the formula (1):

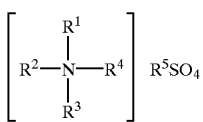

(1)

wherein $R^1$ to $R^4$ are alkyl groups which are the same or different from one another, and $R^5$ is an alkyl or fluoroalkyl group or hydrogen atom, and alkyl quaternary ammonium sulfites (B2) represented by the formula (2):

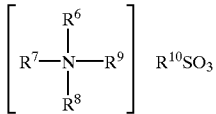

(2)

wherein $R^6$ to $R^9$ are alkyl groups which are the same or different from one another, and $R^{10}$ is an alkyl or fluoroalkyl group or hydrogen atom, wherein said composition has a volume resistivity within a range of $10^5 \cdot 10^{13}$ Ωcm, and wherein said composition exhibits at least one endothermic peak within a temperature range of 185–200° C. as measured under conditions of a heating starting temperature of 30° C. and a heating rate of 10° C./min using a differential scanning calorimeter.

21. A uniaxially or biaxially oriented film of a polyvinylidene fluoride resin composition comprising 100 parts by weight of a polyvinylidene fluoride resin (A), and 0.03 to 10 parts by weight of at least one compound (B) selected from the group consisting of alkyl quaternary ammonium sulfates (B1) represented by the formula (1):

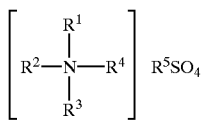

(1)

wherein $R^1$ to $R^4$ are alkyl groups which are the same or different from one another, and $R^5$ is an alkyl or fluoroalkyl group or hydrogen atom, and alkyl quaternary ammonium sulfites (B2) represented by the formula (2):

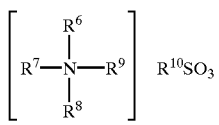

(2)

wherein $R^6$ to $R^9$ are alkyl groups which are the same or different from one another, and $R^{10}$ is an alkyl or fluoroalkyl group or hydrogen atom, wherein said composition has a volume resistivity within a range of $10^5$–$10^{13}$ Ωcm.

* * * * *